ň
3,402,141
PRODUCTION OF LINEAR POLYESTERS PIGMENTED WITH TITANIUM DIOXIDE
Hans Georg Matthies, Ludwigshafen (Rhine), Paul T. Maahs, Bad Durkheim-Seebach, and Fritz Wenger and Friedrich Lieseberg, Ludwigshafen (Rhine), Germany, assignors to Badische Anilin- & Soda-Fabrik Aktiengesellschaft, Ludwigshafen (Rhine), Germany
No Drawing. Continuation-in-part of application Ser. No. 318,785, Oct. 25, 1963. This application July 17, 1967, Ser. No. 653,607
Claims priority, application Germany, Nov. 3, 1962, B 69,477
5 Claims. (Cl. 260—40)

ABSTRACT OF THE DISCLOSURE

Production of linear polyesters pigmented with titanium dioxide by transesterification of alkyl esters of dibasic acids with glycols in the presence of titanium dioxide suspensions and polycondensation of the glycol esters, alumina sols, silicic acid sols or polyphosphate sols being used as suspension stabilizers.

---

This is a continuation-in-part of application Ser. No. 318,785, filed Oct. 25, 1963, now abandoned.

This invention relates to the production of linear polyesters pigmented with titanium dioxide.

It is known to use titanium dioxide having a particle size of up to 3 microns for delustering linear polyesters, for example polyethylene terephthalate, which are to be spun into filaments and fibers. The titanium dioxide is generally added (suspended in ethylene glycol) after the transesterification of dimethyl terephthalate with ethylene glycol and before or during the polycondensation. The amount of titanium dioxide suspension added is such that the final content of titanium dioxide in the finished polycondensate is from 0.3 to 2% by weight.

It is also known to add auxiliaries (stabilizers) to such titanium dioxide suspensions in order (a) to suspend the pigment in ethylene glycol and to keep the suspension stable over a long period and (b) to disperse the pigment uniformly and finely in the finished polycondensate.

Phosphoric acid and boric acid are examples of stabilizers which may be used, but these additives have the disadvantage that they interfere with the reaction.

Surface-active compounds having ionic or non-ionic character, and condensation products of formaldehyde and sulfonated aromatic compounds have also been used as stabilizers. Other authors have described pigment formulations which have been prepared by condensing the pigment particles into the high molecular weight substance. Pigments given such a treatment are reported to be easier to suspend than untreated pigments.

A particular disadvantage of the said methods is that, depending on the nature of the delustering, suitable auxiliaries (stabilizers) must be used which may interfere with the reaction.

According to another method, a mixture of titanium dioxide and calcium terephthalate is added prior to esterification to raise the softening point of the polyester and improve its dyeability. The use of superatmospheric pressure is necessary for this purpose.

It is an object of this invention advantageously to prepare polyesters pigmented with titanium dioxide in which the pigment is uniformly dispersed. Another object of the invention is to use stabilized titanium dioxide suspensions which can be added to the monomers prior to the transesterification reaction without the necessity of changing the conventional conditions for batchwise or continuous polymerization.

Yet another object of the invention is to prepare pigmented polyesters having properties which are not affected by the suspension stabilizers.

The objects of the invention are achieved by carrying out the production of linear polyesters pigmented with titanium dioxide by transesterification of an alkyl ester of a dibasic acid with a glycol in the presence of a stabilized titanium dioxide suspension and polycondensation of the glycol ester, and using as a suspension stabilizer an alumina sol having a pH value of 4 to 6, a silicic acid sol having a pH value of 7 to 9 or a polyphosphate sol having a pH value of 6 to 8 (in each case measured in a 25% by weight aqueous solution).

The alumina sols and silicic acid sols are prepared for example by partial hydrolysis of aluminium chloride or silicates. "Polyphosphate sols" are defined as colloidal aqueous systems which are obtained by mixing polyphosphate with water. The term "polyphosphate" is employed herein as defined by accepted practice in such references as "Phosphorus and Its Compounds" by John R. Van Wazer, volume I, pages 432–433, Interscience Publishers, Inc., New York (1958). A sol contains not only polyphosphates having linear chains but also orthophosphates (cf. loc. cit., p. 738). Polyphosphates may for example be obtained from sodium orthophosphate by thermal treatment with the elimination of water at temperatures of 250° to 620° C. The alumina, silicic acid or polyphosphate sols are generally used in amounts of between 5 and 30% by weight, preferably 10 to 20% by weight, with reference to titanium dioxide. The suspensions of the titanium dioxide are advantageously prepared by means of high speed stirring means. The suspension agent may be a glycol, such as ethylene glycol, propylene glycol, butylene glycol or cyclohexane dicarbinol.

The suspension stabilizers may for example first be themselves dispersed in a glycol, if desired with the addition of a little water, and the resultant dispersion added to the titanium dioxide suspension, or the suspension stabilizers may be dispersed together with the titanium dioxide.

Linear polyesters prepared according to this invention may be prepared by a conventional method by transesterification of alkyl esters of dibasic acids with glycols and subsequent polycondensation. Suitable alkyl esters are the esters of dibasic acids, such as isophthalic acid, adipic acid, vanillic acid and preferably terephthalic acid with alkanols, such as methanol, ethanol or butanol. Suitable glycols are ethylene glycol, propylene glycol and butylene glycol. Dimethyl terephthalate is an example of an ester which may serve as initial material for the polyesters.

The particular advantage of the process according to this invention is that the titanium dioxide suspensions may be added to the monomers prior to the conversion reaction without any change being necessary in the polymerization conditions. This is important not only for batchwise working but particularly for carrying out the process continuously.

The amount of titanium dioxide suspension to be added depends on the desired delustrant effect. The content of titanium dioxide in the finished polyester is usually 0.3 to 2% by weight. Amounts deviating from this range may however be added for particular purposes.

Another advantage of the suspension stabilizers to be used according to this invention is that they do not affect the reaction so that the physical and chemical properties of the finished polycondensate are not impaired.

The invention is illustrated by the following examples. The parts and percentages specified in the examples are units of weight unless otherwise specified.

Example 1

A 1% solution in ethylene glycol is prepared from an alumina sol which has been prepared by partial hydrolysis of aluminum chloride and has a residual chlorine content of 13% and a pH of 4 measured in a 25% aqueous solution). This alumina sol solution is stirred by means of an impeller and such an amount of a commercial titanium dioxide is added that a 6% suspension (A) is formed.

A stabilized titanium dioxide suspension (B), also of 6% strength, is prepared in an analogous way using a silicic acid sol having a content of 25% of silicon dioxide and a pH value of 8 (measured in a 25% aqueous solution) and obtained by acidification of a solution of a silicate. 1.5% and 2% solutions of the silicic acid sol in ethylene glycol are also used as well as the 1% solution.

A stabilized titanium dioxide suspension (C), also of 6% strength, is prepared in an analogous way using a commercial polyphosphate sol having a pH value of 7 (measured in a 25% aqueous solution). The polyphosphate sol is obtained by mixing a polyphosphate with three times its weight of water. The polyphosphate is prepared from sodium orthophosphate by thermal treatment with the elimination of water. 1.5% and 2% solutions of the polyphosphate sol in ethylene glycol are used in addition to the 1% solution.

The good stability of the suspensions as compared with unstabilized suspensions in ethylene glycol or suspensions in ethylene glycol stabilized with boric acid (pigment content 6%) may be seen from Table 1 below. 1% solutions of the stabilizers in ethylene glycol are used for the preparation of the suspensions. The amounts of titanium dioxide still suspended after various periods are measured at room temperature and at 120° C. An addition of 160 parts of dimethyl terephthalate, stirred in at room temperature in one case and at 120° C. in another case, did not decrease the stability of the suspensions. The ash content of the suspension stabilizers is taken into account in the values given. When no stabilizer is added, the suspensions settle completely after two hours.

TABLE 1

| 1% suspension stabilizer used— | Percent of titanium dioxide kept in suspension after— | | | | Temperature, °C. |
|---|---|---|---|---|---|
| | 0 day | 1 day | 3 days | 8 days | |
| None | | | | | 20 |
| Alumina sol (A) | 6 | 5.1 | 4.2 | 3 | 20 |
| Silicic acid sol (B) | 6 | 4.9 | 4.4 | 4.1 | 20 |
| Polyphosphate sol (C) | 6 | 5.1 | 4.8 | 4.4 | 20 |
| Boric acid | 6 | 4.9 | 4.6 | | 20 |
| None | 6 | | | | 120 |
| Alumina sol (A) | 6 | 3.9 | 3.2 | | 120 |
| Silicic acid sol (B) | 6 | 3.9 | 2.9 | | 120 |
| Polyphosphate sol (C) | 6 | 3.8 | 2.8 | | 120 |
| Boric acid | 6 | | | | 120 |

Table 2 gives measurements which indicate the dependence of stability of the suspensions on concentration of the stabilizer.

TABLE 2

| Suspension stabilizer | Concentration, percent | Percent of TiO$_2$ after— | | | Temperature, °C. |
|---|---|---|---|---|---|
| | | 0 day | 1 day | 3 days | |
| Silicic acid sol (B) | 1 | 6 | 4.9 | 4.1 | 20 |
| Do | 1.5 | 6 | 6 | 5 | 20 |
| Do | 2 | 6 | 5.7 | 5.4 | 20 |
| Polyphosphate sol (C) | 1 | 6 | 5.1 | 4.8 | 20 |
| Do | 1.5 | 6 | 4.9 | | 20 |
| Do | 2 | 6 | 4.9 | | 20 |
| Silicic acid sol (B) | 1 | 6 | 3.9 | 2.9 | 120 |
| Do | 1.5 | 6 | 5.5 | 4.5 | 120 |
| Do | 2 | 6 | 5.3 | | 120 |
| Polyphosphate sol (C) | 1 | 6 | 3.8 | 2.8 | 120 |
| Do | 1.5 | 6 | 2 | | 120 |
| Do | 2 | 6 | | | 120 |

Example 2

The suspensions used in Example 1 are stirred for a short time after fourteen days and the proportion of pigment still held in suspension is determined. The values are given in Table 3:

TABLE 3

| 1% suspension stabilizer | Room temperature, 20° C. | 120° C. |
|---|---|---|
| None | | |
| Alumina sol (A) | 5.9 | 5.9 |
| Silicic acid sol (B) | 5.9 | 5.6 |
| Boric acid | | |

Example 3

In this example, experiments are carried out which show that the physical and chemical properties of the finished polyester are not impaired by the suspension stabilizers used according to the invention.

112,400 parts of dimethyl terephthalate, 48,250 parts of ethylene glycol, 9,350 parts of the alumina sol suspension (A) or of the silicic acid sol suspension (B), 85 parts of zinc borate and 43 parts of antimony trioxide are heated in a vessel capable of being heated and fitted with stirring means. The dimethyl terephthalate melts. The temperature is kept at 200° C. until the end of the transesterification during which methanol evaporates. The temperature is then gradually raised to 280° C. and polycondensation is carried out under subatmospheric pressure of less than 1 mm. Hg, with elimination of ethylene glycol, until the desired degree of polycondensation, i.e., until the relative viscosity is more than 1.3 (measured in a 0.5% solution in a mixture of tetrachloroethane and phenol in the ratio 2:3).

Addition of titanium dioxide suspension is regulated so that about 0.5% of pigment is contained in the finished polycondensate. For comparison, an experiment is carried out in which a polyester is prepared without adding a suspension stabilizer, and one in which a polyester is prepared without adding titanium dioxide and a suspension stabilizer, i.e., without adding pigment. The values for time and temperature for the transesterification and polycondensation, and also the relative viscosities (RV) and ash contents of the products are given in the following Table 4. The values for the relative viscosity are measured as described above. In each case the transesterification is quantitive.

TABLE 4

| | Transesterification | Condensation | Remarks |
|---|---|---|---|
| Suspension with alumina sol and TiO$_2$ | 2.5 hours up to 220° C | 3.5 hours up to 280° C | RV:1.41, ash:0.49% |
| Suspension with silicic acid sol and TiO$_2$ | 2.5 hours up to 200° C | do | RV:1.37, ash:0.47% |
| Without suspension stabilizer but with TiO$_2$ | 2 hours up to 210° C | do | RV:1.43, ash:0.43% |
| Without suspension stabilizer and without TiO$_2$ | 2.5 hours up to 210° C | do | RV:1.34 |
| Suspension with polyphosphate sol and TiO$_2$ | 2.5 hours up to 200° C | do | RV:1.36, ash:0.46% |

Example 4

194 parts of dimethyl terephthalate, 288 parts of 1,4-dimethylolcyclohexane (mixture of isomers), 0.05 part of sodium butylate, and 16 parts of a suspension of 6% $TiO_2$ in silica sol (25%) as described in Example 1 are mixed in a heatable vessel fitted with a stirrer and slowly heated to 200° C. The calculated amount of methanol is removed and the resultant reesterification product slowly heated to 300° C., first at atmospheric pressure and then under subatmospheric pressure (below 1 mm.), until the relative viscosity, measured in a mixture of 2 parts of tetrachloroethane and 3 parts of phenol, has reached a value of 0.65. The addition of pigment suspension has no influence on the condensation and the pigment distribution is fine and uniform.

We claim:

1. In a process for the production of linear polyesters pigmented with titanium dioxide by transesterification of an alkyl ester of a dibasic acid with a glycol in the presence of a stabilized titanium dioxide suspension and polycondensation of the glycol ester the improvement which comprises admixing with said titanium dioxide suspension in a glycol as a suspension stabilizer a sol selected from the group consisting of an alumina sol having a pH value of 4 to 6, a silicic acid sol having a pH value of 7 to 9 and a polyphosphate sol having a pH value of 6 to 8, the pH value in each case being measured in a 25% by weight solution wherein said sol is used in amount of 5 to 30% by weight with reference to titanium dioxide.

2. A process as claimed in claim 1 wherein said suspension stabilizer is an alumina sol having a pH value of 4 to 6.

3. A process as claimed in claim 1 wherein said suspension stabilizer is a silicic acid sol having a pH value of 7 to 9.

4. A process as claimed in claim 1 wherein said suspension stabilizer is a polyphosphate sol having a pH value of 6 to 8.

5. A process as claimed in claim 1 wherein said sol is used in an amount of 10 to 20% by weight with reference to titanium dioxide.

References Cited

UNITED STATES PATENTS

| | | | |
|---|---|---|---|
| 2,408,654 | 10/1946 | Kirk | 252—313 |
| 2,819,173 | 1/1958 | Dithmar. | |
| 2,857,355 | 10/1958 | Iler. | |
| 3,002,942 | 10/1961 | Zoetbrood. | |

MORRIS LIEBMAN, *Primary Examiner.*

R. S. BARON, *Assistant Examiner.*